H. KLECKLER.
HANDLING TRUCK FOR FLYING BOATS.
APPLICATION FILED MAR. 31, 1916.

1,287,341.

Patented Dec. 10, 1918.
3 SHEETS—SHEET 1.

Inventor
HENRY KLECKLER.

By

Attorney

H. KLECKLER.
HANDLING TRUCK FOR FLYING BOATS.
APPLICATION FILED MAR. 31, 1916.

1,287,341.

Patented Dec. 10, 1918.
3 SHEETS—SHEET 2.

Inventor
HENRY KLECKLER.

By

Attorney

H. KLECKLER.
HANDLING TRUCK FOR FLYING BOATS.
APPLICATION FILED MAR. 31, 1916.

1,287,341.

Patented Dec. 10, 1918.
3 SHEETS—SHEET 3.

Inventor
HENRY KLECKLER.

By

Attorney

UNITED STATES PATENT OFFICE.

HENRY KLECKLER, OF BUFFALO, NEW YORK, ASSIGNOR TO CURTISS AEROPLANE AND MOTOR CORPORATION, A CORPORATION OF NEW YORK.

HANDLING-TRUCK FOR FLYING-BOATS.

1,287,341.

Specification of Letters Patent. Patented Dec. 10, 1918.

Application filed March 31, 1916. Serial No. 88,095.

*To all whom it may concern:*

Be it known that I, HENRY KLECKLER, a citizen of the United States, residing at Buffalo, in the county of Erie and State of New York, have invented certain new and useful Improvements in Handling-Trucks for Flying-Boats, of which the following is a specification.

My invention relates to aircraft equipment and more particularly to an improved conveyance or handling truck of a construction designed for approximate complemental engagement with the underneath surface of a flying boat to preclude both lateral and longitudinal displacement of the craft with respect thereto.

It is impossible under existing conditions to launch or beach a flying boat or hydroaeroplane without constructing special ways or other devices for that purpose. Moreover, craft of the character mentioned, unlike aeroplanes, have no means such as landing gear whereby movement from place to place, on land, is facilitated. It is, therefore, the primary object of the present invention to build and equip a handling truck with a means whereby movement of aerial watercraft, on land, may be effected and such craft launched or beached by simply placing or removing the truck body respectively beneath or from beneath the hull of the craft and thereafter beaching or launching the craft as desired.

While I have illustrated and shall hereinafter describe a handling truck of a construction particularly adaptable to the handling and transportation of boats having a stepped bottom, it is to be understood at the outset that the supporting surface of the truck may be modified or varied in configuration to approximately complementally engage with the underneath surface of any and all hull bodies regardless of their particular shape or design.

As a further object of the invention, I contemplate an essentially novel means of a construction whereby in a launching or beaching operation, the weight of such means will suffice to submerge or sink the truck and during transportation will facilitate movement of the truck from place to place.

In the accompanying drawings is illustrated one embodiment in my invention, that now best known to me, but as is well recognized my invention may be given many other forms by those skilled in the art without departing in any wise from its generic spirit.

Figure 1:
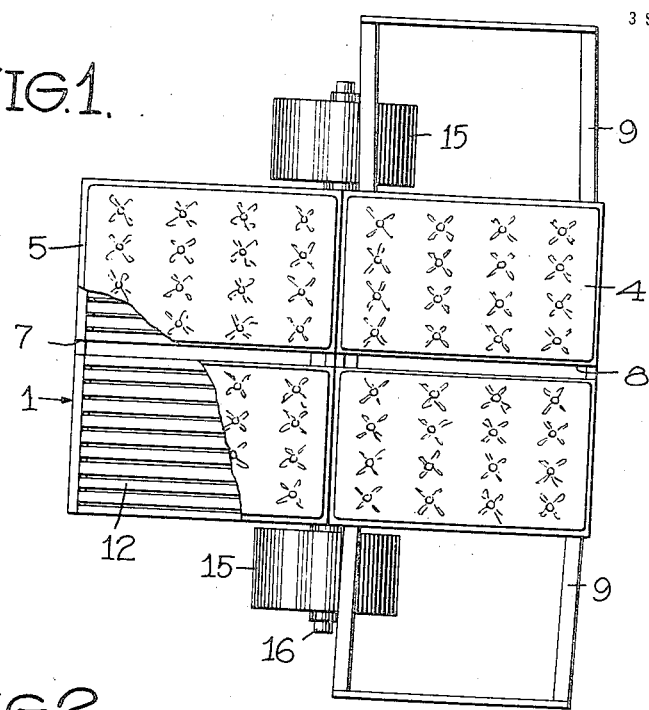
Figure 1 is a top plan view of my improved handling truck.

The truck body, designated as an entirety by the numeral 1, is preferably rectangular and provided with a horizontally flat underneath surface 2 and a specially constructed or designed top surface 3, the latter surface being upholstered as indicated at 4 to engage with the underneath surface of the hull of the hydroplane (not shown) in connection with which the handling truck is to be used. The upholstery 4 is tacked or otherwise suitably fastened as indicated at 5 to the truck body 1 and divided both longitudinally and transversely for a purpose hereinafter more particularly described.

A step 6 is formed in the top surface 3 of the truck body to accommodate the step usually formed aft of the hydroplaning bottom of a hydroaeroplane. The complemental engagement of the one step with the other will preclude longitudinal displacement of the craft with respect to the truck. The forward portion of the top surface 3 of the truck is inclined upwardly from the step portion 6 at a slight angle to the horizontal to approximately complementally engage with the hydroplaning bottom of the hydroaeroplane. The said forward portion of the top surface 3 has a salient angle in cross section and is longitudinally grooved as indicated at 7 to accommodate the keel of the hydroaeroplane and accordingly preclude lateral displacement of the hull thereof with respect to the truck body 1. That portion of the top surface aft of the step 6 is inclined upwardly from said step at an angle to the horizontal and constructed in cross section of a greater salient angle to approximately complementally engage with the bottom of the tail portion of the hydroaeroplane hull. The said rear portion is likewise longitudinally grooved as indicated at 8 to accommodate the keel of the tail portion of the hull.

Figure 3:
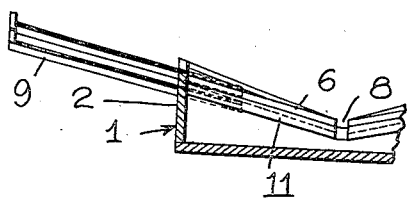
Fig. 3 is a fragmentary transverse sectional view illustrating the manner in which the bilge-fin supports are braced and secured to the interior of the truck body.
Figure 4:
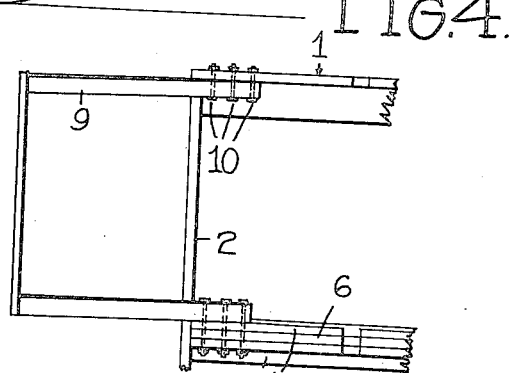
Fig. 4 is a top plan view of that portion of the truck illustrated in Fig. 3.
Figure 5:
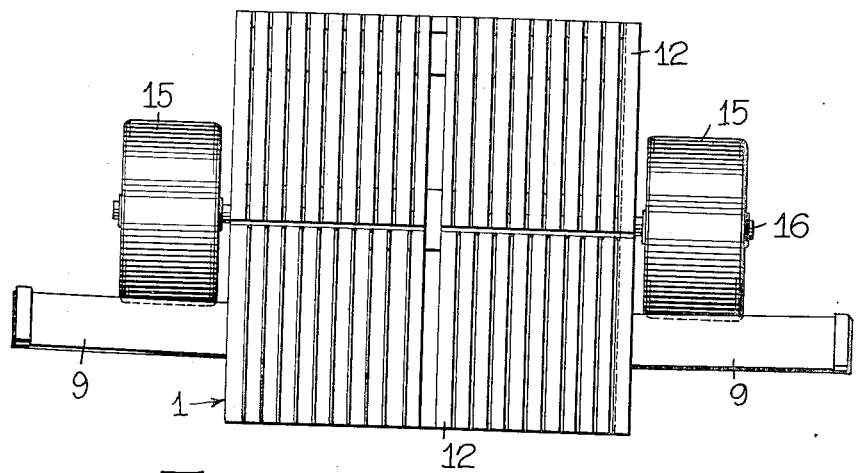
Fig. 5 is a top plan view of a modified form of handling truck.
Figure 6:
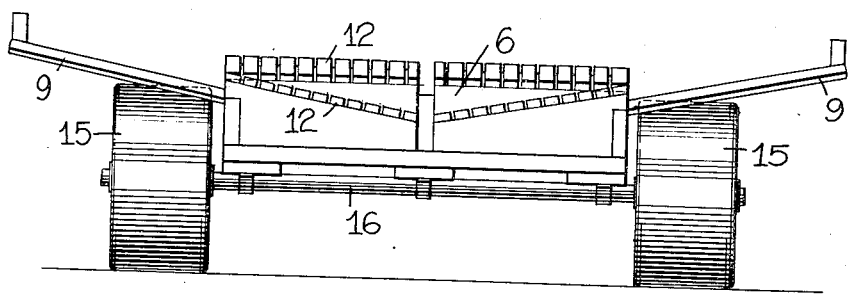
Fig. 6 is an end view of the truck illustrated in Fig. 5.
Figure 7:
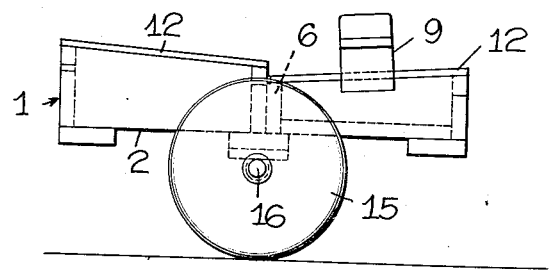
Fig. 7 is a side elevation of the mentioned modified form.

Bilge-fin supports 9 extend laterally beyond the opposite longitudinal edges of the body of the truck to engage throughout the greater portion of their length with the bilge-fins of a hydroaeroplane where such fins are provided as for instance in hydroaeroplanes of the "Curtiss" type. The mentioned supports 9 effectually stabilize the craft and conjointly serve to preclude lateral displacement thereof during transportation from place to place in a manner more specifically hereinafter described. Upon reference to Fig. 3 it will be observed that the longitudinals of the side supports 9 extend into the interior of the body 1 to provide for securement as indicated at 10 in Fig. 4. Through such an arrangement, it is evident that the longitudinals of the said supports will bear directly on the sides of the truck body 1. The said body 1 is transversely braced approximately equidistant from its ends as indicated at 11, the forward longitudinals being extended interiorly of said body as above pointed out to engage therewith at the point where the mentioned body is effectually braced.

Figure 2:
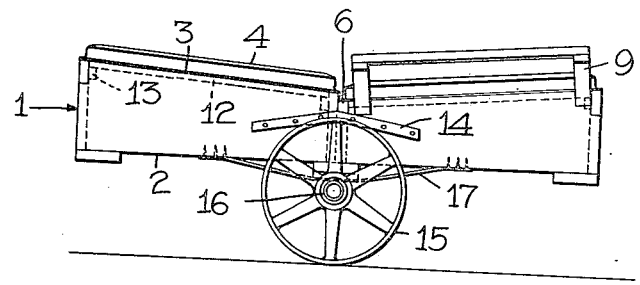
Fig. 2 is a side elevation.

Planking 12 extends longitudinally of the body 1 to directly support the upholstering 4 and accordingly support the craft resting thereon. In the preferred form of the invention, the planking is located to extend flush with the top surface of the truck frame; end rails 13 being provided to support the planking as illustrated in Fig. 2. Metallic strips 14 brace the truck from end to end.

Comparatively broad and exceedingly heavy wheels 15 are utilized to support the truck and to facilitate movement thereof in transporting a craft from place to place. These wheels are mounted at opposite sides of the body 1 on a suitable axle 16 therefor secured against the underneath side 2 of the body preferably in the vertical plane of the step 6 formed in the top surface 3 thereof. The axle 16 is braced to the truck body 1 as indicated at 17 in Fig. 2.

By constructing the supporting wheels 15 in the manner described, it is evident that the truck, if wheeled into the water will instantaneously sink and thereafter permit ready placement beneath the hull or other flotation body required to be beached. The side arms or supports 9 will act as guides in so arranging the truck beneath the craft. With the craft properly resting on the top surface of the truck in a manner precluding both lateral and longitudinal displacement of the craft with respect thereto, the truck is pulled or withdrawn from the water and the craft accordingly beached. In launching a craft, almost a reverse operation takes place since it is desired, in launching, that the craft be conducted from its beached position to a position afloat upon the water. The mentioned wheels also serve as a means whereby movement of the truck from place to place, on land, is facilitated, the relatively wide wheel tread effectually sustaining the truck with the weight imposed thereon upon the surface of the land.

Figure 8:
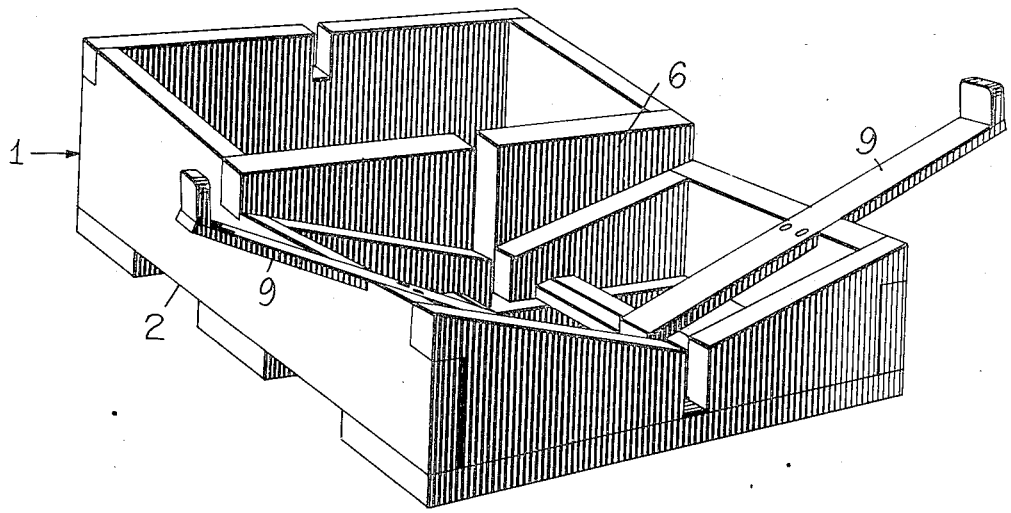
Fig. 8 is a detail perspective view of the truck body, the top planking and upholstering having been removed.
Figure 9:
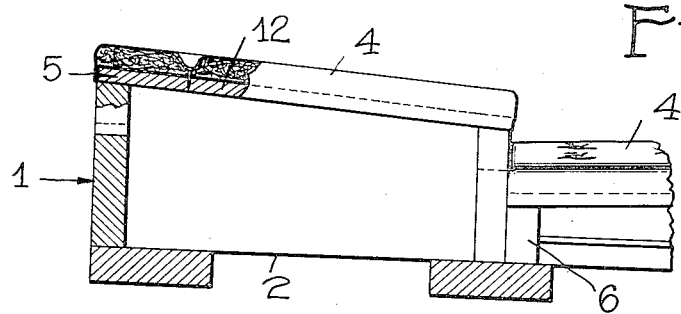
Fig. 9 is a detail longitudinal sectional view, partly in elevation, illustrating the manner in which the planking and upholstering is mounted on said body.

Coming now to a description of the modification illustrated in Figs. 5-10 inclusive, the body of the truck has the same general characteristics as the body 1 described hereinbefore. The top surface of the body 1 of the modified truck is, however, horizontally flat in cross section forwardly of the step 6 and salient in cross section aft thereof. The bilge fin supports 9 are of a somewhat different construction in that they constitute but a single longitudinal. Each support is braced to the interior of the body as illustrated in Fig. 8 in much the same manner as hereinbefore described. The planking 12 of the modified form is secured or fastened on the top of the frame of the truck body 1 as illustrated in Fig. 9 with the upholstering 4 fastened as indicated at 5 to the planking rather than to the frame. In all other respects, the general characteristics of the modified truck body 1 are the same as described with reference to the preferred truck body.

Figure 10:
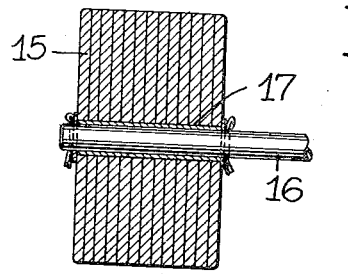
Fig. 10 is a detail cross sectional view of one of the laminated truck wheels.

The supporting wheels 15 may be, if desired and as illustrated in Fig. 10, constructed of laminated strips mounted on a hub 17 for the wheel axle 16 of the truck. While no particular advantage is gained by so constructing the wheels, the said wheels have been shown thus constructed.

In use, the body of the truck is so arranged beneath the body of the craft that the underneath surface of the craft may engage with the top surface 3 of the truck, the step in the bottom of the craft engaging with the step 6 in the top of the truck to preclude longitudinal displacement of the craft with respect thereto and the keel of the craft engaging in the longitudinal groove 7—8 of the truck to preclude lateral displacement of said craft with respect thereto. Lateral and longitudinal displacement is to a large extent prevented by the approximate conformation of the top surface of the truck to the underneath surface of the craft. The lateral supports 9 engage with the bilge fins of the craft where such fins are provided. They serve as guides to position the craft as well as supports to stabilize. After mounting the craft on the body in the manner stated, the craft may be transported from place to place with facility and ease and readily launched or beached as occasion demands, the supporting wheels dually functioning to facilitate transportation and to submerge the truck under the conditions outlined.

While in reduction to practice, I have found that the forms of my invention hereinbefore illustrated are most efficient and practical, I desire it to be understood that various minor changes and modifications may be made in later adaptations providing such changes and variations are included in the appended claims.

What is claimed is:

1. A handling and launching truck for hydro-aircraft comprising a body portion having its top surface transversely notched to provide an abutment against which the under surface of the craft may abut, said abutment further providing a stop whereby longitudinal displacement of the craft is prevented together with a support for the truck body symmetrically disposed thereunderneath.

2. A handling and launching truck for hydro-aircraft comprising a truck body, a transverse abutment formed upon the top surface of said body, said truck body at its extremities extending upwardly beyond the horizontal plane of said abutment, said abutment and said extending portions both adapted to engage the craft, the abutment functioning as a stop against longitudinal displacement thereof and the extended portions as a supporting means for the craft.

3. A handling and launching truck for hydro-aircraft comprising a truck body, a transverse abutment formed upon the top surface of said body, said truck body at its extremities extending upwardly beyond the horizontal plane of said abutment, said abutment and said extending portions both adapted to engage the craft, the abutment functioning as a stop against longitudinal displacement thereof and the extended portions as a supporting means for the craft and a support for said truck body symmetrically arranged beneath it, said supporting means conjointly functioning as a weight for submerging the truck body in launching and beaching the craft.

4. A vehicle for supporting and launching hydro-aircraft comprising a body portion having a forward floor space and a rearward floor space, said floor spaces being longitudinally discontinuous at their point of junction to provide an abrupt transverse step for the purpose set forth.

5. A vehicle for supporting and launching hydro-aircraft comprising a body portion having a floor extending from the forward to the rearward end thereof and provided with a pronounced vertical step at a point substantially midway of its length, and a carrying axle carried by the vehicle body substantially in the vertical plane of the step between the discontinuous forward and rearward parts of the floor surface.

6. A vehicle for supporting and launching hydro-aircraft comprising a body portion having a floor surface longitudinally discontinuous at a point intermediate its ends, the forward part of said discontinuous floor surface being backwardly and downwardly inclined and the rearward portion of the said discontinuous floor surface having a salient cross-section, the inner ends of said floor surfaces terminating substantially in a vertical plane to thereby form an abrupt vertical step for the purpose set forth.

7. A vehicle for supporting and launching hydro-aircraft, comprising a body portion having a floor surface longitudinally discontinuous at a point intermediate its ends, the forward part of said discontinuous floor surface being backwardly and downwardly inclined and the rearward portion of the said discontinuous floor surface being forwardly and downwardly inclined and having a salient cross-section, the inner ends of said floor surfaces terminating substantially in a transverse plane to thereby form an abrupt transverse step, said forward and rearward floor surfaces having alined longitudinal grooves for the purpose set forth.

8. A vehicle for supporting and launching hydro-aircraft comprising a body portion having a floor surface longitudinally discontinuous at a point intermediate its ends, the forward part of said discontinuous floor surface being backwardly and downwardly inclined and the rearward portion of the said discontinuous floor surface being forwardly and downwardly inclined and having a salient cross-section, the inner ends of said floor surfaces terminating substantially in a vertical plane to thereby form an abrupt vertical step, said rearward portion having laterally extending bilge fin supports for the purpose set forth.

In testimony whereof I affix my signature.

HENRY KLECKLER.

Copies of this patent may be obtained for five cents each, by addressing the "Commissioner of Patents, Washington, D. C."